United States Patent [19]
Huddleston et al.

[11] Patent Number: 5,597,060
[45] Date of Patent: Jan. 28, 1997

[54] CENTRIFUGAL ACTUATOR FOR CENTRIFUGAL CLUTCH

[75] Inventors: H. Mike Huddleston, Richmond, Ind.; Charles W. Sieb, New Paris, Ohio

[73] Assignee: Hoffco, Inc., Richmond, Ind.

[21] Appl. No.: 323,376

[22] Filed: Oct. 14, 1994

[51] Int. Cl.⁶ .......................... F16D 43/06; F16H 55/52
[52] U.S. Cl. .......................... 192/105 C; 474/14
[58] Field of Search .......................... 192/105 C, 99 A; 474/14; 403/152

[56] References Cited

U.S. PATENT DOCUMENTS

| | | | |
|---|---|---|---|
| 639,415 | 12/1899 | Lutz | 403/152 X |
| 2,651,210 | 9/1953 | Clark | 474/14 |
| 2,743,895 | 5/1956 | Tygh | 403/152 X |
| 3,759,111 | 9/1973 | Hoff . | |
| 3,986,406 | 10/1976 | Prasad | 474/14 |
| 4,298,112 | 11/1981 | Carstensen | 192/99 A X |
| 4,993,280 | 2/1991 | Olkoski et al. | 74/553 |
| 5,305,418 | 4/1994 | Tuttle | 74/553 X |
| 5,326,330 | 7/1994 | Bostelmann . | |

*Primary Examiner*—Rodney H. Bonck
*Attorney, Agent, or Firm*—Barnes & Thornburg

[57] ABSTRACT

A centrifugal actuator is provided for a centrifugal clutch. The centrifugal clutch includes a drive spider having a cam lever-following roller and a moveable clutch housing. The centrifugal actuator includes two bosses, each boss having a mechanism for coupling to the clutch housing. Each boss is formed to include a pin-receiving opening. The bosses are arranged in spaced-apart relation on the clutch housing to form a central slot therebetween. A cam lever having an interior wall arranged to define a D-shaped pin-receiving opening is positioned to lie in the central slot and is arranged to pivot to maintain engagement of the cam lever and the cam lever-following roller. A pivot pin is rotatably received in the pin-receiving openings of the two bosses and the D-shaped pin-receiving opening of the cam lever. The pivot pin includes an elongated flat exterior wall and an elongated curved exterior wall arranged so that a transverse cross section of the pivot pin is D-shaped. The entirety of the interior wall of the cam lever engages the pivot pin.

26 Claims, 2 Drawing Sheets

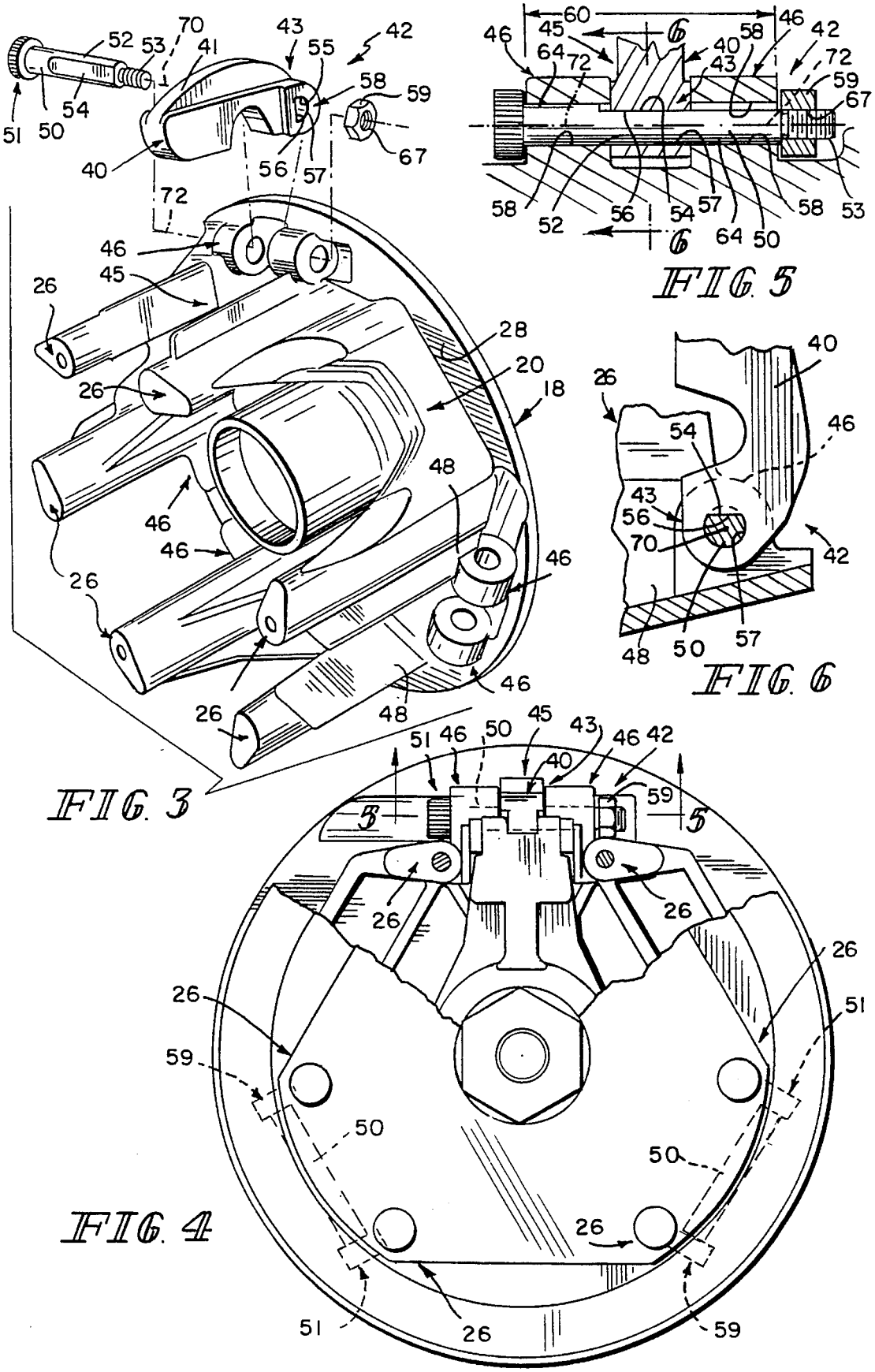

CENTRIFUGAL ACTUATOR FOR CENTRIFUGAL CLUTCH

BACKGROUND AND SUMMARY OF THE INVENTION

The present invention relates to a centrifugal clutch for use in recreational vehicles, and particularly to centrifugal cam levers that move by centrifugal force to actuate a variable-speed pulley included in the centrifugal clutch. More particularly, the present invention relates to a pivot assembly for mounting a centrifugal cam lever for pivotable movement about an axis in a centrifugal clutch.

Recreational vehicles such as golf carts, snowmobiles, and go-karts are typically provided with a centrifugal clutch assembly that includes a variable-speed pulley. A variable-speed pulley is connected to an engine shaft and typically includes a fixed pulley flange mounted on the engine shaft and a movable pulley flange that is able to slide back and forth along the longitudinal axis of the engine shaft. Typically, a drive belt lies in a V-shaped groove defined between the fixed and movable pulley flanges. When the pulley flanges are closer together, the drive belt is turned at a higher speed. When the flanges are further apart, the drive belt is turned at a lower speed. See, for example, U.S. Pat. No. 3,759,111 to Hoff for a description of a centrifugal clutch with a variable-speed pulley.

A variable-speed pulley of the type disclosed in the Hoff '111 patent is typically actuated to increase the speed of a drive belt coupled to the variable-speed pulley by a plurality of pivotable centrifugal cam lever attached to a circular movable pulley flange of the variable-speed pulley and mounted to lie in spaced-apart relation around the circumference of the circular movable pulley flange. Typically, such centrifugal cam levers are mounted on cylindrical pivot pins as disclosed in the Hoff '111 patent so that each centrifugal cam lever swings outwardly about the longitudinal axis of its cylindrical pivot pin during rotation of the variable-speed pulley about the longitudinal axis of the engine shaft on which the variable-speed pulley is mounted.

One of the wear areas in a centrifugal clutch is the pivot area at the base of each centrifugal cam lever. Centrifugal clutch operational problems develop once a centrifugal cam lever wears on its pivot pin. A conventional stationary pivot pin uses only the area of contact between the pivot pin and its centrifugal cam lever. This bearing area is small due to loading. In addition, increased wear in the pivot area of the centrifugal cam lever causes noisy operation of a centrifugal clutch. Avoidance of such "pivot area" wear would extend the operational life and enhance quiet operation of a centrifugal clutch.

Various bushings, coatings, and platings could be used on a pivot pin in an effort to reduce wear between a centrifugal clutch lever and its pivot pin. All of these options were considered during the development of the present invention and found to be expensive and to produce less than desired results. For example, bushings between pivot pins and centrifugal cam levers wear rapidly because of limited bearing surface area and bearing span. Due to loading, really only one side of the bushing is being used.

What is needed is a pivot assembly for use in supporting a centrifugal cam lever for pivotable movement in a variable-speed centrifugal clutch that is easy to assemble, inexpensive to produce, and is produced with a minimum number of parts. Vehicle manufacturers would appreciate a pivot assembly that additionally reduces wear of the pivot bearing area on the pivot pin and centrifugal cam lever, that reduces wear of a roller that is mounted on a fixed drive spider included in the centrifugal clutch and that is arranged to engage the free-swinging end of the centrifugal cam lever, and that allows a centrifugal cam lever to pivot with substantially the same ease and success after a significant amount of use as it did when it was new.

According to the present invention, a centrifugal actuator is provided for use in a centrifugal clutch. The centrifugal actuator is for use in a centrifugal clutch of the type having a variable-speed pulley including a fixed pulley flange that is configured to define one side of a belt-receiving V-shaped groove and mounted on a rotatable drive shaft. The variable-speed pulley also includes a movable pulley flange that is configured to define another side of the belt-receiving V-shaped groove and mounted to slide axially on the rotatable drive shaft to vary the width of the V-shaped groove. A fixed base or "drive spider" is mounted on the rotatable drive shaft and is configured to carry at least one centrifugal cam lever-engaging roller.

The centrifugal actuator includes a D-shaped pivot pin (in transverse cross-section) with a longitudinal extending flat, a cam lever or swing weight formed to include a D-shaped through-hole, and pivot pin support means on the movable pulley flange. Illustratively, the pivot pin with flat slides through apertures formed in the pivot pin support means and the D-shaped through-hole formed in the cam lever. A head on one end of the pivot pin and a nut threaded onto another end of the pivot pin is used to locate the pivot pin such that the flat on the pivot pin passes through the D-shaped through-hole formed in the cam lever.

In preferred embodiments, the centrifugal actuator includes a cylindrical pivot pin, a centrifugal cam lever, and two pivot pin support mounts. The cylindrical pivot pin has a longitudinal axis, a cylindrical first end having an enlarged head, a second end formed to include a threaded post for receiving a threaded nut, and a central portion therebetween. The central portion includes an elongated flat exterior surface extending along the longitudinal axis of the pivot pin so that a transverse cross-section of the central portion of pivot pin is D-shaped. Illustratively, the flat surface continues along at least a portion of the second end to simplify manufacture of the pivot pin.

The centrifugal cam lever has a base end formed to include a D-shaped pin-receiving opening and an opposite tip end. Illustratively, the D-shaped central section of the pivot pin fits into the D-shaped opening in the cam lever in close fitting relation so that the pivot pin rotates about its longitudinal axis in response to pivoting movement of the centrifugal cam lever about the longitudinal axis of the pivot pin. The tip end of the centrifugal cam lever is configured to engage and "push off" against one of the rollers mounted on the fixed drive spider during operation of the centrifugal clutch. This push off action is sufficient to urge the movable pulley flange in a direction toward the fixed pulley flange while the drive belt lies in the V-shaped groove so as to narrow the width of the V-shaped groove and increase the speed of the drive belt. Thus, pivoting movement of the centrifugal cam lever functions to "actuate" the centrifugal clutch so as to change the speed of a drive belt engaging the variable speed pulley in the centrifugal clutch.

The two pivot pin support mounts are configured to be appended to the movable pulley flange and face away from the fixed pulley flange. The pivot pin support mounts lie in spaced-apart relation to one another and each pivot pin support mount is formed to include a cylindrical pin-receiving opening. A first end of the pivot pin is received in the cylindrical pin-receiving opening of one pivot mount and the second end of the pivot pin is received in the cylindrical pin-receiving opening of the other pivot mount. The "flattened" central portion of the pivot pin is received in the D-shaped opening formed on the base of the centrifugal cam lever so that the pivot pin rotates about its longitudinal axis in response to pivoting movement of the centrifugal cam lever about the longitudinal axis of the pivot pin. Illustratively, the flat exterior surface on the pivot pin is made large enough to make the pivot pin rotate with the cam lever but small enough to ensure that the pivot pin stays centered within the cylindrical pin-receiving openings formed in the pivot pin support mounts. The tip of each centrifugal cam lever is configured to engage one of the rollers on the fixed base during pivoting movement of such centrifugal cam lever about the longitudinal axis of the pivot pin.

Illustratively, the pivot pin has a longitudinal axis of rotation, the pin-receiving openings formed in the pivot pin support mounts each have a central axis, and the flat exterior surface formed on the pivot pin is sized so that the axis of rotation of the pivot pin is coincident with the central axis of the pin-receiving openings formed in the pivot pin support mounts. Additionally, the flat exterior surface formed on the pivot pin is positioned so that a full D-shaped circumference of the pivot pin engages a D-shaped interior surface in the centrifugal cam lever defining the D-shaped opening therein whenever the centrifugal cam lever pivots about the longitudinal axis of the pivot pin during operation of the centrifugal clutch.

Use of the centrifugal actuator in accordance with the present invention, which actuator includes a pivot pin having a D-shaped cross section and a centrifugal cam lever having a D-shaped pivot pin-receiving opening, ensures that the centrifugal cam lever and the pivot pin move as one piece during pivoting movement of the centrifugal cam lever, just as if the cam lever were integrally appended to the pivot pin. This united movement advantageously increases the bearing contact area between the cam lever and the pivot pin. It also advantageously increases the bearing span from the axial length of the area of engagement of the centrifugal cam lever along the pivot pin to the combined axial length of the two pin-receiving openings formed in the pivot pin support mounts plus the distance between the pin-receiving openings.

Increasing the bearing area reduces the wear of the pivot pin. Increasing the bearing span both reduces wear on the pivot pin and further stabilizes the cam lever thereby reducing wear of the roller mounted on the fixed drive spider and permitting a reduction of the number of parts in the assembly. Vehicle owners and vehicle manufacturers would appreciate a pivot assembly that requires fewer parts and that results in less wear of moving and camming parts.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 3 is a perspective view of a clutch housing including a pair of spaced-apart pivot pin support mounts and components of the centrifugal actuator of FIGS. 1 and 2 prior to assembly showing the curved centrifugal cam lever formed to include a D-shaped opening, a pivot pin configured to include a central portion having a D-shaped transverse cross-section and sized to be inserted into the D-shaped opening formed in the centrifugal cam lever, and a nut used to retain the pivot pin in the clutch housing;

FIG. 4 is a top plan view of the clutch housing of FIGS. 1–3, with portions broken away, showing the centrifugal cam lever in its mounted position between two pivot pin support bunts appended to the clutch housing;

FIG. 5 is a sectional view taken along line 5—5 of FIG. 4 showing the pivot pin passing through openings formed in each of the pivot pin support mounts and engagement of a flat exterior surface on the pivot pin and a flat interior wall formed in the centrifugal cam lever to define one segment of the border of the D-shaped opening; and FIG. 6 is a sectional view taken along line 6—6 of FIG. 5 showing the D-shaped opening formed in the centrifugal cam lever and a D-shaped portion of the shaft of the pivot pin inserted in close fitting relation therein.

DETAILED DESCRIPTION OF THE DRAWINGS

Figure 1:
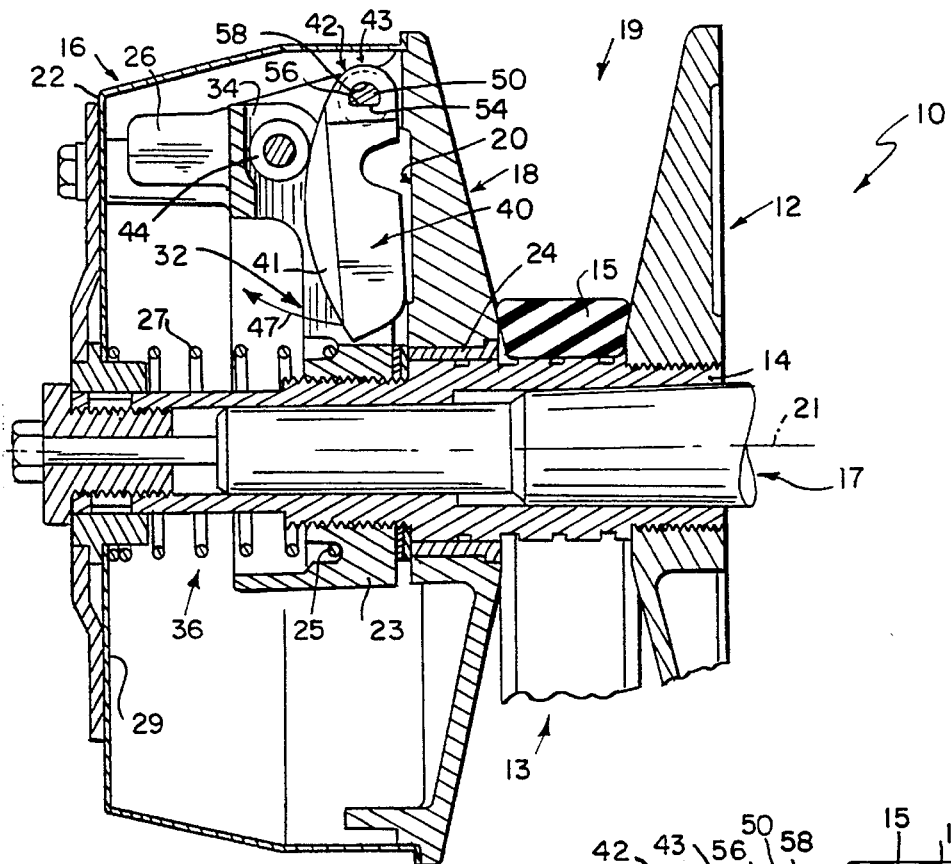
FIG. 1 is a sectional view of a centrifugal clutch having a variable-speed pulley and a centrifugal actuator in accordance with the present invention, the centrifugal actuator including a centrifugal cam lever mounted on a D-shaped central section of a rotatable pivot pin, showing a left-side movable pulley flange of the variable-speed pulley in its normal open position away from a right-side fixed pulley flange and a curved camming surface on the centrifugal cam lever.

An improved centrifugal actuator 42 for use in actuating a variable-speed pulley 13 included in a centrifugal clutch 10 is illustrated in FIGS. 1–6. Centrifugal actuator 42 is designed to resist wear so as to enhance the operating life and quiet operation of centrifugal clutch 10. Essentially, the centrifugal actuator 42 includes a pivotable cam lever 40 that pivots from an inactive position shown in FIG. 1 to an active position shown in FIG. 2 during operation of centrifugal clutch 10 to actuate the variable-speed pulley 13. Centrifugal actuator 42 further includes improved wear-resistant means for supporting pivotable movement of cam lever 40. Advantageously, such improved wear-resistant pivot support means is well suited for use in a centrifugal clutch of the type used in snowmobiles, golf carts, and other recreational vehicles. Reference is hereby made to U.S. Pat. No. 3,759,111 to Hoff, which is incorporated by reference herein for a description of a suitable centrifugal clutch for accepting a centrifugal actuator 11 in accordance with the present invention.

Figure 2:
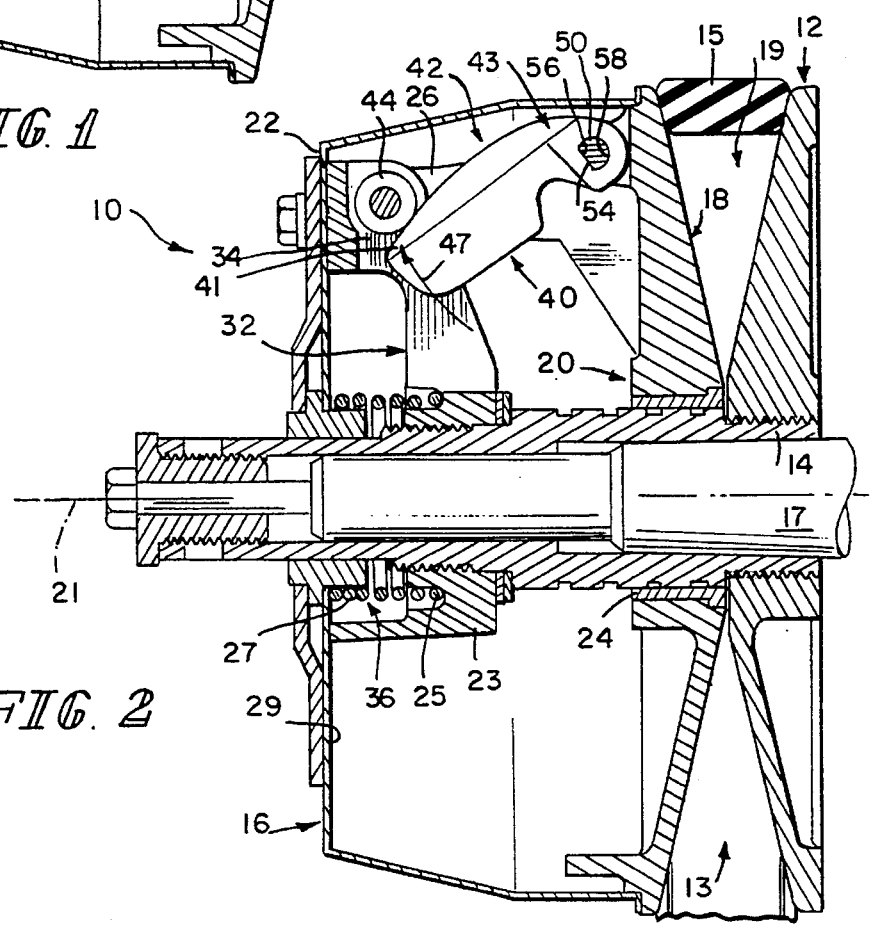
FIG. 2 is a view similar to FIG. 1 showing the movable pulley flange forced over toward the right-side fixed pulley flange to its cam-actuated closed position by clockwise pivoting movement of the centrifugal cam lever (about the longitudinal axis of the D-shaped pivot pin) reacting against the roller appended to a fixed drive spider included in the centrifugal clutch.

A centrifugal clutch 10, illustrated in FIGS. 1 and 2, includes a variable-speed pulley 13 for driving drive belt 15 at a certain speed in response to rotation of an engine drive shaft 17 on which centrifugal clutch 10 is mounted. The variable-speed pulley 13 includes a fixed pulley flange 12 mounted to an elongated hub 14 coupled to engine drive shaft 17 as shown in FIGS. 1 and 2. The variable-speed pulley 13 further includes a movable pulley flange 18 which cooperates with the fixed pulley flange to define a V-shaped groove 19 receiving drive belt 15 therein. A movable assembly 16 including a movable shell 22 and the movable pulley flange 18 is mounted to a sliding bearing 24 on the hub 14.

The movable pulley flange 18 is able to move back and forth along a longitudinal central axis 21 of engine drive shaft 17 in response to an actuation force applied by centrifugal cam lever 40 (in the manner described below) to change the effective width of the drive belt-receiving V-shaped groove 19 during operation of centrifugal clutch 10 and thus vary the speed of the drive belt 15. The position of the movable pulley flange 18 along longitudinal axis 21 relative to the fixed pulley flange 12 is controlled by centrifugal actuator 42 and a spring 36 mounted in centrifugal clutch 10 in the manner described below.

The movable pulley flange 18 is formed to include a clutch housing 20 arranged to extend away from fixed pulley flange 12 as shown in FIG. 2. The clutch housing 20 has a plurality of pairs of axially extending drive posts 26 adjacent its periphery 28 through which it is rotatively driven by a drive spider 32. Illustratively, three pairs of drive posts 26 are arranged in circumferentially spaced-apart relation about the perimeter of clutch housing 20 as shown in FIG. 4. The drive spider 32 includes a central hub 23 that is fixed on the hub 14 and a plurality of radially outwardly extending spider arms 34. Each spider arm 34 is positioned to lie in the space provided between one of the pairs of posts 26 in torque-transmitting relation therewith. Thus, the drive spider 32 is keyed to rotate with the engine drive shaft 17 and the fixed pulley flange 12 and is also keyed to rotate the clutch housing 20 of the movable pulley flange 18 about longitudinal axis 21 in response to rotation of the engine drive shaft 17 and the fixed pulley flange 12.

A compression spring 36 is provided inside the movable shell 22 as shown in FIGS. 1 and 2 to assist in controlling the position of the clutch housing 20 of movable pulley flange 18 relative to the fixed pulley flange 12 during operation of the centrifugal clutch 10. The spring 36 has a first end 25 that engages the central hub 23 of the drive spider 32 and a second end that engages an inner wall 29 of the movable shell 22. The spring 36 normally acts against the fixed hub 23 to urge the movable shell 22 along longitudinal axis 21 in a direction away from the fixed pulley flange 12 as shown in FIG. 1. As a result, the width of the V-shaped groove 19 between the fixed pulley flange 12 and the movable pulley flange 16 is maximized so that the drive belt 15 can move to the position shown in FIG. 1.

The movable pulley flange 18 is thrust axially toward the fixed pulley flange 12 during operation of the centrifugal clutch 10 by centrifugal weights lying in the clutch housing 12 and acting between the movable pulley flange 18 and the relatively fixed spider arms 34. The preferred centrifugal weights are centrifugal cam levers 40 appended to the movable pulley flange 16 by a pivot assembly 42 and reacting against cam lever-following rollers 44 mounted on the drive spider 32. One such roller 44 is mounted on each spider arm 34 and each roller 44 is arranged to be engaged by the tip 41 of a companion centrifugal cam lever 40.

The centrifugal actuator 42 includes a centrifugal cam lever 40 having a base 43 positioned to lie in a central slot 45 formed between two pivot pin support mounts or bosses 46 appended to the base 48 of each pair of drive posts 18 and mounted on a pivot pin 50. Each cam lever 40 normally swings outwardly along an arc 47 under centrifugal force (generated during rotation of centrifugal clutch 10 about longitudinal axis 21) against a companion roller 44 appended to the drive spider 32.

During the operation of the centrifugal clutch 10, the pulley 13 is normally held in wide-groove condition as shown in FIG. 1 in which the belt is free between the pulley flanges and in de-clutched condition. As the shaft speed is increased, the centrifugal cam levers 40 will swing outward against the rollers 44 in the spider arm 34, and will thrust the movable pulley flange 18 to the right away from the fixed spider arms 34 and toward closed position as shown in FIG. 2. Initial movement carries the pulley flanges 12, 18 into engagement with the belt 15 and as speed increases, the groove between the pulley flanges 12, 18 is progressively narrowed and the belt 15 is moved outward to its maximum position shown in FIG. 2. It is assumed that the belt is connected to a driven pulley (not shown). At all speeds, and especially at high speeds which generate high centrifugal forces on the post 26 and other parts of the variable ratio pulley mechanism, all parts of the structure are strongly tied together to resist failure under centrifugal force. When high speed has carried the movable pulley flange 18 to fully closed position as shown in FIG. 2, any additional centrifugal force produced by still higher speeds will of course produce additional thrust. But that thrust will be contained and transmitted directly to the posts 26 to produce stress in tension and will not be transmitted to other parts to produce bending stress.

A disassembled centrifugal actuator 42 is illustrated in FIG. 3 and an assembled centrifugal actuator 42 is illustrated in FIG. 4. The pivot pin 50 includes a shaft 52 and threads 53 that are received by threads 67 of a nut 59 that holds the pivot pin 50 between the pivot pin support mounts 46. Pivot pin 50 also includes an enlarged head 51 at one end. Although a threaded bolt is illustrated, the pivot pin 50 may be a rivet or any other hardware providing a shaft that can be rotatably assembled to define the centrifugal actuator 42 and shaped as described below without altering the scope of the invention as presently perceived.

Illustratively, the cam lever 40 is formed to include an interior wall 55 defining the perimeter of the pin-receiving opening 58. The interior wall 55 is illustratively D-shaped and includes a flat interior surface 56 and a C-shaped surface 57. The shaft 52 is provided with a flat exterior surface 54 that corresponds to the flat interior surface 56 provided on the interior wall 55 around the pin-receiving opening 58 in the cam lever 40. The flat exterior surface 54 provides the shaft 52 with a D-shaped transverse cross section at certain points along its length as shown, for example, in FIG. 3. The D-shaped perimeter wall defining D-shaped opening 58 in the cam lever 40 is sized to match and mate with the D-shaped portion of the shaft 52 in close fitting relation so that the cam lever 40 and the pivot pin 50 pivot as one piece about axis 70.

Though it has been found to be economical to provide a D-shaped opening 58 in the cam lever 40 and a corresponding D-shaped transverse cross-section at points along the length of the shaft 52, many alternative configurations would also cause the pivot pin 50 to rotate in response to the pivoting movement of the cam lever 40, thereby improving the wear characteristics of the centrifugal actuator 42. For example, if the shaft 52 were provided with a ridge rather than the flat 54 and the interior wall 55 of the cam lever 40 were provided with a ridge-receiving groove rather than the flat 56, the cam lever 40 and the pivot pin 50 would still move as one piece. A transverse cross-section of the shaft 52 may assume any suitable shape and the interior wall 55 may assume any corresponding shape that causes the pivot pin 50 to rotate in response to the pivoting movement of the cam lever 40.

Further, other techniques may be employed to cause the pivot pin 50 to rotate in response to the pivoting movement of the cam lever 40. For instance, press fitting a pivot pin into an opening in a cam lever and forming a cam lever that is integrally appended to a pivot pin are two of several techniques that could be used to cause the pivot pin 50 to rotate in response to the pivoting movement of the cam lever 40.

The flat 56 is large enough to ensure that the pivot pin 50 pivots with the cam lever 40 but small enough to ensure a full circumference of the shaft 52 is in contact with the pin-receiving openings 58 in the direction of the load. The flat is also small enough to ensure that the pivot pin 50 is centered in the pin-receiving openings 58 formed in the spaced-apart pivot pin support mounts or bosses 46. The pivot pin 50 has a longitudinal axis of rotation 70 and each cylindrical pin-receiving opening 58 is formed to include a central axis 72. The central axis 72 of each adjacent pin-receiving opening 58 and the axis of rotation 70 of the pivot pin 50 are arranged to be coincident, as illustrated in FIGS. 3 and 5.

Preferably, the pivot pin 50 is made from carbon steel that is plated with hard chromium plating. The hard chromium plating reduces fretting between the cam lever 40 and the pivot pin 50 which results in less wear to the pivot assembly 42 and to the roller 44. The pivot pin 50 may, however, be made from any suitable material.

The bearing span 60, illustrated in FIG. 5, is the lateral distance between the extreme edges of the two bearing areas 64 of the centrifugal actuator 42. The bearing area 64 is the contact area of the bearing surfaces of the centrifugal actuator 42. Use of the pivot pin 50 having a D-shaped shaft 52 and a cam lever 40 having a D-shaped opening 58 forces the cam lever 40 and the pivot pin 50 to pivot together as if they were one piece, thereby forcing the bearing area 64 to include the contact area between the pivot pin 50 and the two pivot pin support mounts 46.

If a pivot assembly (not shown) were built with a conventional pivot pin having a cylindrically-shaped shaft and a conventional cam lever having a cylindrically-shaped opening, the cam lever would move independently of the pivot pin. In this circumstance, the smaller area of engagement between the cam lever and the pivot pin would be the bearing area of the pivot assembly. Use of the centrifugal actuator 42 of the present invention causes the pivot pin 50 and the cam lever 40 to move as one piece, changing which surfaces act as bearing surfaces, thereby enlarging the bearing area 64 without changing the size of any elements in the pivot assembly 42.

Likewise, if a pivot assembly (not shown) were built with a pivot pin having a cylindrically-shaped shaft and a cam lever having a cylindrically-shaped opening so that the cam lever would move independently of the pivot pin, the axial distance between the extreme edges of the area of engagement between the cam lever and the pivot pin would constitute the bearing span of the pivot assembly. Use of the pivot assembly 42 of the present invention causes the pivot pin 50 and the cam lever 40 to move as one piece, changing which surfaces act as bearing surfaces, thereby enlarging the bearing span 60 without changing the size of any elements in the pivot assembly 42.

As the bearing area 64 increases, the wear suffered by the pivot assembly 42 will be spread over the greater area resulting in longer wear life for the pivot assembly 42. As the bearing span 60 increase, the stability of the cam lever 40 will improve resulting in longer wear life both for the pivot assembly 42 and the roller 44.

The flat interior surface 56 of the cam lever 40 also stabilizes the cam lever 40, reducing the side-to-side motion of the cam lever 40 caused by centrifugal forces that are present when the clutch 10 is in operation. This stabilization helps to eliminate thrust washers normally located on each side of the cam lever 40 in the central slot 45 of the movable clutch housing 20. These thrust washers make assembly more difficult and always inhibit rotation of the pivot pin 50 by wearing into the pivot pin 50. The stabilization of the cam lever 40 also reduces wear in the cam lever-following rollers 44. The pivot pin 50 is chrome plated to prevent corrosion between the clutch housing 20 and the pivot pin 50. The chrome plating also reduces fretting between the cam lever 40 and the pivot pin 50. The pivot pin 50 is slip fit into the pin-receiving opening 58 in the cam lever 40 to ease assembly but could also be press fit into the opening 58.

By insuring that the pivot pin 50 rotates with the cam lever 40, the wear area is the bearing area 64 rather than the smaller area of engagement between the cam lever 40 and the pivot pin 50, increasing the wear area and the cam lever 40 stabilization over centrifugal actuators made from conventional pivot pins and cam levers due to utilizing two bearing areas 64 that are separate, thus reducing wear.

Consumers and manufacturers alike will appreciate the greater reliability and longer wear life brought about by causing the cam lever 40 and the pivot pin 50 to pivot together as one piece. Additionally, manufacturers will appreciate the simple design and the ease of assembly of the centrifugal actuator 42 of the present invention.

Although the invention has been described with reference to a preferred embodiment, additional variations and modifications exist within the scope and spirit of the invention as described and defined in the following claims.

We claim:

1. A centrifugal actuator for a centrifugal clutch including a drive spider having a cam lever-following roller and a movable clutch housing, the centrifugal actuator comprising two bosses having means for coupling to the clutch housing, each boss being formed to include a pin-receiving opening, the bosses being arranged in spaced-apart relation on the clutch housing to form a central slot therebetween, a cam lever having an interior wall arranged to define a D-shaped pin-receiving opening, the cam lever being positioned to lie in the central slot and arranged to pivot to maintain engagement of the cam lever and the cam lever-following roller, and a pivot pin rotatably received in the pin-receiving openings of the two bosses and the D-shaped pin-receiving opening of the cam lever, the pivot pin including an elongated flat exterior wall and an elongated curved exterior wall arranged so that a transverse cross section of the pivot pin is D-shaped, the entirety of the interior wall of the cam lever engaging the pilot pin.

2. The centrifugal actuator of claim 1, wherein the flat wall is sized so that a full circumference of the pivot pin is present where the pivot pin contacts the interior wall in the direction of the load.

3. The centrifugal actuator of claim 1, wherein the pivot pin has an axis of rotation, each pin-receiving opening has a central axis, and the pin receiving openings are arranged and the flat wall is sized so that the axis of rotation of the pivot pin and the two pin-receiving opening central axes are coincident.

4. The centrifugal actuator of claim 1, wherein the pivot pin further includes a longitudinal axis, a cylindrical first end, a cylindrical second end, and a cylindrical central portion therebetween, the central portion being formed to include the elongated flat exterior wall.

5. The centrifugal actuator of claim 4, wherein the second end of the pivot pin further includes threads and the centrifugal clutch further includes an annular nut having an annular interior surface formed to include threads received by the threads on the second end of the pivot pin, the nut being arranged to hold the pivot pin to the bosses.

6. A centrifugal clutch comprising an elongated hub, a drive spider fixed to the hub, a cam lever-following roller appended to the drive spider, a movable clutch housing including means for slidably mounting the clutch housing to the hub, a spring arranged to urge the clutch housing axially toward the drive spider, two bosses appended to the clutch housing, each boss being formed to include a pin-receiving opening, the bosses being arranged in spaced-apart relation on the clutch housing to form a central slot therebetween, a pivot pin rotatably received in the pin-receiving openings, the pivot pin including an elongated flat exterior wall and an elongated curved exterior wall arranged so that a transverse cross section of the pivot pin is D-shaped, and a cam lever including a tip and a base having an interior wall arranged to define a D-shaped pin-receiving opening, the base of the cam lever being positioned to lie in the central slot, the pivot pin being received by the D-shaped pin-receiving opening having the entirety of the interior wall engaging the D-shaped portion of the pivot pin, and the tip of the cam lever being arranged to engage the cam lever-following roller to slide the movable clutch housing along the hub away from the drive spider as the cam lever pivots in response to rotation of the hub.

7. The centrifugal clutch of claim 6, wherein the pivot pin further includes a longitudinal axis, a cylindrical first end, a cylindrical second end, and a cylindrical central portion therebetween, the central portion being formed to include the elongated flat exterior wall.

8. The centrifugal clutch of claim 7, wherein the second end of the pivot pin further includes threads and the centrifugal clutch further includes an annular nut having an annular interior surface formed to include threads received by the threads on the second end of the pivot pin, the nut being arranged to hold the pivot pin to the bosses.

9. A centrifugal actuator for use in a centrifugal clutch of the type having a variable-speed pulley including a fixed pulley flange configured to define one side of a belt-receiving V-shaped groove and mounted on a rotatable drive shaft, a movable pulley flange configured to define another side of the belt-receiving V-shaped groove and mounted to slide axially on the rotatable drive shaft to vary the width of the V-shaped groove, and a fixed base mounted on the rotatable drive shaft and configured to carry at least one roller thereon, the centrifugal actuator comprising a cylindrical pivot pin having a longitudinal axis, a first end, a second end, and a central portion therebetween, the central portion being formed to include an elongated flat surface extending along the longitudinal axis of the pivot pin from the central portion to the first end so that a transverse cross-section of the central portion of pivot pin is D-shaped, a centrifugal cam lever having a base end formed to include a D-shaped pin-receiving opening and an opposite tip end, and first and second pivot pin support mounts configured to be appended to the movable pulley flange and lie in spaced-apart relation to one another, each pivot pin support mount being formed to include a cylindrical pin-receiving opening, the first end of the pivot pin being received in the cylindrical pin-receiving opening of the first pivot mount, the second end of the pivot pin being received in the cylindrical pin-receiving opening of the second pivot mount, and the central portion of the pivot pin being received in the D-shaped opening of the centrifugal cam lever so that the pivot pin rotates about its longitudinal axis in response to pivoting movement of the centrifugal cam lever about the longitudinal axis of the pivot pin, the centrifugal cam lever being configured to engage the tip thereof and the roller on the fixed base during pivoting movement of the centrifugal cam lever about the longitudinal axis of the pivot pin.

10. The centrifugal actuator of claim 9, wherein the pivot pin includes an enlarged head appended to the first end, a threaded nut-receiving member appended to the second end, and a shaft extending between the enlarged head and the threaded nut-receiving member, and the shaft includes the central portion.

11. The centrifugal actuator of claim 10, wherein the shaft includes a cylindrical portion intermediate the enlarged head and the central portion.

12. The centrifugal actuator of claim 10, further comprising a threaded nut coupled to the threaded nut-receiving member and wherein each of the first and second pivot support mounts includes an exterior side wall and lies between the enlarged head and the threaded nut, the enlarged head abuts the exterior side wall of the first pivot support mount, and the threaded nut abuts the exterior side wall of the second pivot support mount.

13. A centrifugal actuator for a centrifugal clutch including a drive spider having a cam lever-following roller and a movable clutch housing, the centrifugal actuator comprising two bosses having means for coupling to the clutch housing, each boss being formed to include a pin-receiving opening, the bosses being arranged in spaced-apart relation on the clutch housing to form a central slot therebetween, a cam lever having an interior wall arranged to define a D-shaped pin-receiving opening, the cam lever being positioned to lie in the central slot and arranged to pivot to maintain engagement of the cam lever and the cam lever-following roller, and a pivot pin rotatably received in the pin-receiving openings of the two bosses and received in the D-shaped pin-receiving opening of the cam lever, the pivot pin including a first end, a second end, and a shaft therebetween, the shaft having an elongated curved exterior wall and an elongated flat exterior wall, the flat exterior wall extending from the first end to a position on the shaft spaced apart from the first end.

14. The centrifugal actuator of claim 13, wherein the pivot pin further includes an enlarged head at the second end.

15. The centrifugal actuator of claim 13, further comprising a threaded portion appended to the first end of the pivot pin.

16. The centrifugal actuator of claim 13, wherein the interior wall of the cam lever engages the pivot pin between the first end and the position on the shaft spaced-apart from the first end.

17. The centrifugal actuator of claim 16, wherein the entirety of the interior wall of the cam lever engages the pivot pin.

11

18. A centrifugal actuator for a centrifugal clutch including a drive spider having a cam lever-following roller and a movable clutch housing, the centrifugal actuator comprising two bosses appended to the clutch housing and arranged in spaced-apart relation to form a central slot therebetween, each boss being formed to include a pin-receiving opening, a cam lever positioned to lie in the central slot, and a pivot pin coupled to the bosses and coupled to the cam lever so that the cam lever pivots relative to the bosses, the pivot pin including a longitudinal axis, a first end, a second end, a central portion therebetween, and an elongated flat surface extending along the longitudinal axis from the central portion to the first end, the flat surface being positioned to lie in the pin-receiving opening formed in one of the bosses.

19. The centrifugal actuator of claim 18, wherein the central portion is spaced-apart from the second end so that the pivot pin between the central portion and the second end is generally cylindrical.

20. The centrifugal actuator of claim 18, wherein the pivot pin further includes an enlarged head at the second end and further comprising a threaded portion appended to the first end of the pivot pin.

21. A centrifugal actuator for a centrifugal clutch including a drive spider having a cam lever-following roller and a movable clutch housing, the centrifugal actuator comprising two bosses appended to the clutch housing and arranged in spaced-apart relation to form a central slot therebetween, each boss being formed to include a pin-receiving opening, an elongated pivot pin rotatably coupled to the bosses, the pivot pin including a first end, a second end, and a non-round portion therebetween having a non-round transverse cross-section, the non-round portion being positioned to lie in the pin-receiving opening formed in one of the bosses, and a cam lever positioned to lie in the central slot, the cam lever including an interior wall defining a pin-receiving opening, the pivot pin being received by the pin-receiving opening and the entirety of the interior wall engaging the central portion of the pivot pin so that the pivot pin rotates in response to pivoting movement of the cam lever.

22. The centrifugal actuator of claim 21, wherein the central portion includes a flat surface.

23. The centrifugal actuator of claim 21, wherein the non-round cross-section of the pivot pin extends from the central portion to the first end.

24. The centrifugal actuator of claim 23, wherein the pivot pin further includes an enlarged head at the second end and further comprising a threaded portion appended to the first end of the pivot pin.

25. A centrifugal actuator for a centrifugal clutch including a drive spider having a cam lever-following roller and a movable clutch housing, the centrifugal actuator comprising two bosses appended to the clutch housing and arranged in spaced-apart relation to form a central slot therebetween, each boss being formed to include a pin-receiving opening, a cam lever positioned to lie in the central slot, and a pivot pin rotatably coupled to the bosses and fixed to the cam lever so that the pivot pin rotates relative to the bosses in response to the pivoting movement of the cam lever positioned to lie in the pin-receiving opening formed in one of the bosses.

26. The centrifugal actuator of claim 25, wherein the cam lever includes an interior wall defining a pin-receiving opening and the pivot pin is press fit into the opening.

* * * * *